Feb. 17, 1942. H. A. HARRIS ET AL 2,273,102

GRIP BOLT

Filed Feb. 14, 1941

INVENTORS
DAVID RASKY
HARRY A. HARRIS
BY HARRIS, KIECH, FOSTER & HARRIS

FOR THE FIRM

ATTORNEYS.

Patented Feb. 17, 1942

2,273,102

UNITED STATES PATENT OFFICE 2,273,102

GRIP BOLT

Harry A. Harris, Whittier, and David Rasky, Los Angeles, Calif.

Application February 14, 1941, Serial No. 378,856

1 Claim. (Cl. 287—58)

Our invention relates to machine elements, and the principal object is to provide means by which a primary member can be locked against movement with relation to a secondary member. Our invention has a peculiar utility when applied to scientific instruments, and although it may be used for many other purposes, and we do not intend to limit our invention to this particular use, we will confine our description to this particular use. It is a further object of our invention to provide a device for firmly locking such primary and secondary members together in such a manner that the surfaces of these members which are in contact with each other will not be marred or scratched.

Referring to the drawing, which is for illustrative purposes:

Figure 1:
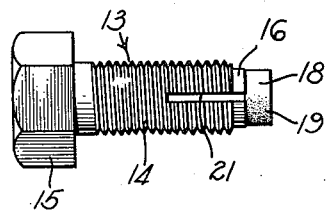
Fig. 1 is a side elevation of a locking device.
Figure 2:
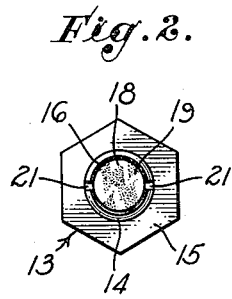
Fig. 2 is an end elevation of same.
Figure 3:
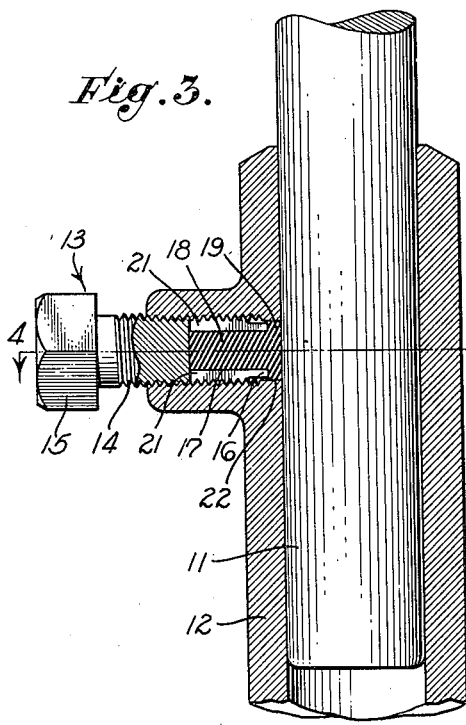
Fig. 3 is a section showing one application of the device.
Figure 4:
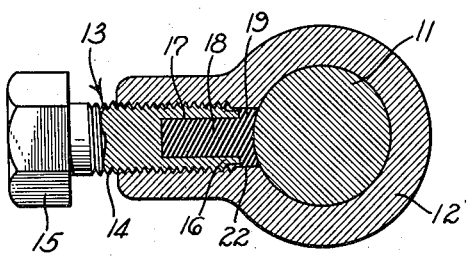
Fig. 4 is a section on a plane represented by line 4—4 of Fig. 3.

The method of using our invention can be understood from an inspection of Fig. 3, in which 11 is a cylindrical primary member which slides or turns in a cylindrical bore in a secondary member 12. The primary member 11 is very accurately fitted in this bore so that if its exterior surface is scratched, it will not turn or slide freely. Such constructions are used in various types of scientific instruments, the parts of which must at all times be accurately aligned with each other.

To provide a device which will enable the primary member 11 to be rigidly locked in the secondary member 12, we provide a grip bolt 13 which has a threaded portion 14 and which may have any sort of a head or shank 15 by which the bolt 13 may be turned. The end 16 of the grip bolt 13 has a counterbore 17 in which is placed a conical or cylindrical member 18 formed of a material softer than the primary member 11, soft vulcanized rubber being an excellent material to use. The member 18 may have a head 19 slightly smaller than the diameter of the threaded portion 14 of the grip bolt 13 at the base of the threads thereof. The grip bolt is threaded in the secondary member 12 and the end 16 is slotted as shown at 21.

Figure 5:
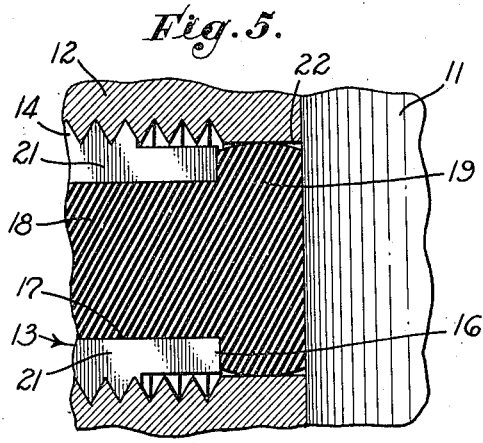
Figs. 5 and 6 are enlarged sections of a portion of Fig. 3.
Figure 6:
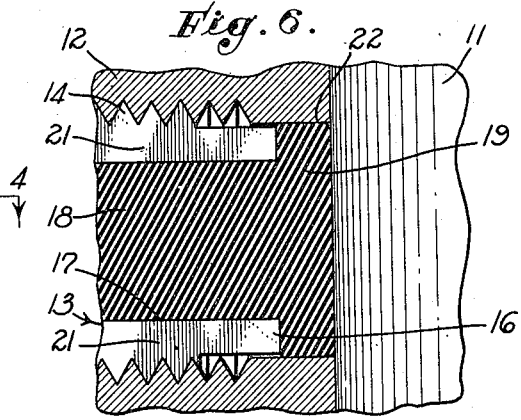

The method by which the grip bolt 13 grips the primary member 11 will be understood from a study of Figs. 5 and 6. As the grip bolt is turned, it is forced to the right, as seen in Fig. 3, so that the end 16 is forced toward the secondary member 12.

The head 19 of the member 18 is thus forced against the member 11 and is deformed in shape, the head 19 becoming of larger diameter as the bolt is screwed home. If the bolt is turned further the head 19 substantially fills the cavity 22 between the end 16 of the bolt 13 and the member 11. Rubber and, in fact, most soft materials, being only slightly compressible although freely deformable, may also be used. As soon as the head 19 of the member 18 entirely fills the cavity 22, a very high internal pressure may be developed in the body of the rubber which causes the rubber to adhere to the outer surface of the member 11 and to conform to the cylindrical contour of that surface. This high internal pressure on the soft material is transmitted to the soft material in the counterbore 17, and this pressure, being exerted outwardly, tends to expand the bolt against the threads of the member 12 and thus causes the bolt to be frictionally locked against turning. The end 16 of the bolt, being provided with the slot 21, can be readily expanded sufficiently to provide this locking.

Since the material from which the member 18 is made is considerably softer than the material used in the member 11, no amount of pressure exerted by the member 18 on the member 11 will injure the surface of the member 11 and, even after it has been subjected to such pressure, if the pressure is released by backing off the bolt 13, the member 11 can still slide and turn freely in the member 12.

We claim as our invention:

A device for insuring the rigid locking of a primary member to or in a secondary member in such manner that said members, at any time, can be released from rigid relationship with each other, and the contact between the surfaces of said members will not be impaired due to said locking, comprising: a bolt threaded in said secondary member in such a manner that it may be advanced toward or retracted from the surface of said primary member by a rotation of said bolt; and a body of material softer than the material of said primary member, said material being carried in a cavity in the end of said bolt adjacent said surface, said material projecting beyond the end of said bolt in the form of an enlarged head smaller in diameter than the body of said bolt, so that, as said bolt is advanced toward said surface, said projecting end frictionally contacts said surface and is compressed between the end of said bolt and said surface.

HARRY A. HARRIS.
DAVID RASKY.